United States Patent Office 2,746,962
Patented May 22, 1956

2,746,962

MORPHINAN DERIVATIVES

Otto Schnider, Basel, Switzerland, assignor to Hoffmann-La Roche Inc., Nutley, N. J., a corporation of New Jersey No Drawing. Application June 25, 1953,
Serial No. 364,185

Claims priority, application Switzerland December 8, 1952

8 Claims. (Cl. 260—285)

This invention relates to new chemical compounds useful in therapeutics, and more particularly useful as antitussive agents. The compounds of the invention constitute the class consisting of 2,17-dimethyl-3-hydroxy-morphinan and acid addition salts thereof. 2,17-dimethyl-3-hydroxy-morphinan exists in optically active and racemic forms; the invention includes the levorotatory and dextrorotatory forms of the compounds above referred to, as well as the racemic forms thereof.

2,17-dimethyl-3-hydroxy-morphinan (which can also designated by the alternative nomenclature 2,N-dimethyl-3-hydroxy-morphinan) can be represented by the following formula:

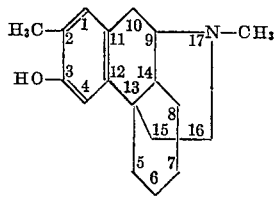

Compounds of the above formula can be made by treating 3-hydroxy-N-methyl-morphinan in a Mannich reaction with a dialkyl amine and formaldehyde (or a compound capable of liberating formaldehyde) and subjecting the 2-dialkyl-aminomethyl-3-hydroxy-N-methyl-morphinan obtained to catalytic hydrogenation, thereby splitting off the same dialkylamine used as starting material. Either racemic, dextro- or levo- 2,17-dimethyl-3-hydroxy-morphinan is obtained, depending upon whether the starting material is racemic, dextro- or levo- 3-hydroxy-N-methyl-morphinan, respectively. By reaction with various acids, the bases thus prepared can be converted to water-soluble salts.

In order to effect the Mannich reaction, the 3-hydroxy-N-methyl-morphinan base is advantageously dissolved in a solvent, e. g. methyl alcohol, ethyl alcohol or butyl alcohol, and heated for some time under a reflux condenser with a di(lower alkyl)amine, e. g. diethylamine or dibutylamine, in the presence of formalin or paraformaldehyde, according to procedures known per se. The thus obtained 2-di(lower alkyl)aminomethyl-3-hydroxy-17-methyl morphinans are strong bases which form water-soluble salts with acids. In order to convert these bases to 2,17-dimethyl-3-hydroxy-morphinan, they are advantageously dissolved in a solvent such as methanol or ethanol, and hydrogenated catalytically under pressure and with heating. When operating at 50 atmospheres gage pressure and 150° C., the hydrogenation to liberate the secondary amine is completed within a short time. The 2,17-dimethyl-3-hydroxy-morphinan product can be obtained by concentration of the reaction mixture; it is obtained as a base in the form of colorless crystals which are difficultly soluble in water but easily soluble in the usual organic solvents. The base forms water-soluble salts with acids such as hydrochloric acid, hydrobromic acid, sulfuric acid, phosphoric acid and tartaric acid.

Example 1

A mixture of 257 g. of racemic 3-hydroxy-N-methyl-morphinan, 80 g. of diethylamine and 50 g. of paraformaldehyde in 1,000 ml. of ethyl alcohol is heated for 10 hours under reflux. After distilling off the alcohol and the excess diethylamine, 500 g. of water are added and also sufficient hydrochloric acid to make a weak congo acid solution. Ammonia is added to the clear solution until no more cloudiness results, and the precipitated base is taken up in benzene. The residue remaining after the benzene has been driven off (340–345 g.) is dissolved in 700 ml. of absolute alcohol, set to a weak congo acid reaction with about 220 ml. of 48 per cent hydrobromic acid, and ether is added until cloudiness occurs, whereupon crystallization soon begins. The crystal slurry is thoroughly cooled and filtered. After drying, a practically quantitative yield of racemic 2-diethylaminomethyl-3-hydroxy-N-methyl-morphinan dihydrobromide of M. P. 252–253° C. is obtained.

504 g. of this compound are dissolved in 600 ml. of water, and the base is liberated by means of ammonia. The base is taken up in ether, the ether is distilled off, and the residue (342 g.) is dissolved in 1600 ml. of methanol and subjected to hydrogenolysis by treatment with hydrogen in the presence of palladized carbon under 50 atmospheres gage pressure and at 150° C. The solution, after separation from the catalyst, is concentrated in a partial vacuum and the residue is dissolved by warming with 2,000 ml. of benzene. Upon cooling, large crystals of racemic 2,17-dimethyl-3-hydroxy-morphinan containing 1 molecule of benzene of crystallization are obtained. After being filtered off and dried, these have a melting point of 89–92° C., with preliminary sintering.

These crystals are dissolved in water and dilute hydrochloric acid, the solution is concentrated in order to remove the benzene of crystallization, and racemic 2,17-dimethyl-3-hydroxy-morphinan hydrochloride is allowed to crystallize out. This compound crystallizes as a monohydrate which, after air-drying at about 40° C., melts at 149–150° C. with foaming. The base prepared therefrom melts at 183–184° C. 2,17-dimethyl-3-hydroxy-morphinan hydrochloride is rather soluble in water, with practically neutral reaction; is easily soluble in alcohol; and insoluble in ether.

Example 2

By heating 257 g. of racemic 3-hydroxy-N-methyl-morphinan with 180 g. of dibutylamine and 180 g. of paraformaldehyde in 2,000 ml. of alcohol for 12 hours under reflux, there is obtained, after working up according to the method of Example 1, racemic 2-dibutylaminomethyl-3-hydroxy-N-methyl-morphinan, as a clear oil soluble in dilute acids.

Without purification, the compound is subjected to hydrogenolysis. By working according to the method of Example 1 there is obtained, in addition to dibutylamine which can be reused, racemic 2,17-dimethyl-3-hydroxy-morphinan, having the properties described in Example 1.

Example 3

By treating levo-3-hydroxy-N-methyl-morphinan according to the method of Example 1 there is obtained levo-2,17-dimethyl-3-hydroxy-morphinan hydrochloride, as a monohydrate, M. P. 171–173° C. The base liberated therefrom has M. P. 203–204° C.; $[\alpha]_D^{20} = -36.3$ for c=3.0 in water.

Exactly the same properties, except for rotation in the opposite sense, are exhibited by dextro-2,17-dimethyl-3-hydroxy-morphinan, obtained in analogous fashion from dextro-3-hydroxy-N-methyl-morphinan.

I claim:
1. A compound selected from the group consisting of 2,17-dimethyl-3-hydroxy-morphinan and acid addition salts thereof.
2. 2,17-dimethyl-3-hydroxy-morphinan.
3. An acid addition salt of a compound according to claim 2.
4. An optically active form of a compound according to claim 2.
5. An acid addition salt of a compound according to claim 4.
6. An acid addition salt of levo-2,17-dimethyl-3-hydroxy-morphinan.
7. Levo-2,17-dimethyl-3-hydroxy-morphinan.
8. A compound selected from the group consisting of 2-di(lower alkyl)aminomethyl-3-hydroxy-17-methyl-morphinan and acid addition salts thereof.

References Cited in the file of this patent

UNITED STATES PATENTS 2,524,855 Schnider et al. _____ Oct. 10, 1950

FOREIGN PATENTS 278,410 Switzerland _____ Feb. 16, 1952